(12) United States Patent
Kantzas et al.

(10) Patent No.: US 10,760,389 B2
(45) Date of Patent: Sep. 1, 2020

(54) EXTRACTION METHODS AND SYSTEMS FOR RECOVERY OF OIL FROM RESERVOIRS CONTAINING MOBILE WATER

(71) Applicant: CEC North Star Energy Ltd., Calgary (CA)

(72) Inventors: Apostolos Kantzas, Calgary (CA); Jonathan Bryan, Calgary (CA); Robert Richardson, Calgary (CA); Donald E. H. Jones, Calgary (CA)

(73) Assignee: CEC NORTH STAR ENERGY LTD., Calgary, Alberta (CA)

( * ) Notice: Subject to any disclaimer, the term of this patent is extended or adjusted under 35 U.S.C. 154(b) by 122 days.

(21) Appl. No.: 16/120,965

(22) Filed: Sep. 4, 2018

(65) Prior Publication Data

US 2019/0071957 A1    Mar. 7, 2019

Related U.S. Application Data

(60) Provisional application No. 62/599,439, filed on Dec. 15, 2017, provisional application No. 62/554,716, filed on Sep. 6, 2017.

(51) Int. Cl.
*E21B 43/16* (2006.01)
*E21B 43/34* (2006.01)
(Continued)

(52) U.S. Cl.
CPC .......... *E21B 43/166* (2013.01); *E21B 43/164* (2013.01); *E21B 43/34* (2013.01); *E21B 43/40* (2013.01); *E21B 37/06* (2013.01)

(58) Field of Classification Search
CPC ........ E21B 37/06; E21B 43/16; E21B 43/166; E21B 43/162; E21B 43/164;
(Continued)

(56) References Cited

U.S. PATENT DOCUMENTS 3,954,141 A    5/1976   Allen et al.
8,684,079 B2   4/2014   Wattenbarger et al.
(Continued)

FOREIGN PATENT DOCUMENTS

CA    2349234 A1    11/2002
CA    2688392 A1    6/2011

OTHER PUBLICATIONS

An International Search Report and Written Opinion issued by the International Searching Authority dated Dec. 10, 2018 in connection with international patent application No. PCT/CA2018/051070.

*Primary Examiner* — David Carroll
(74) *Attorney, Agent, or Firm* — Baker & McKenzie

(57) ABSTRACT

The present disclosure relates to, according to some embodiments, an extraction process for recovering an oil from an oil reservoir comprising a mobile water. The extraction process includes the step of injecting a first solvent into the oil reservoir through the at least one injection well to form a first mixture, the first mixture comprising the first solvent, a first portion of mobile water, and a first portion of oil. Additionally, the extraction process includes the steps of recovering the first mixture from the at least one production well to produce a first recovered oil mixture, the first recovered oil mixture comprising the first solvent, the first portion of the mobile water, and the first portion of oil; separating the first recovered oil mixture to produce a first recovered oil fraction that is separated from the first portion of mobile water and the first solvent; and injecting a second solvent into the oil reservoir through the at least one injection well to form a second mixture, the second mixture comprising the second solvent, a second portion of mobile water, and a second portion of oil. The extraction process also includes the steps of recovering the second mixture from the at least one production well to produce a second recovered oil mixture, the second recovered oil mixture (Continued)

comprising the second solvent, the second portion of the mobile water, and the second portion of oil, and separating the second recovered oil mixture to produce a second recovered oil fraction that is separated from the second portion of mobile water and the second solvent.

21 Claims, 6 Drawing Sheets

(51) Int. Cl.
*E21B 43/40* (2006.01)
*E21B 37/06* (2006.01)

(58) Field of Classification Search
CPC ........ E21B 43/168; E21B 43/20; E21B 43/25; E21B 43/40; E21B 43/34; E21B 43/255
See application file for complete search history.

(56) References Cited

U.S. PATENT DOCUMENTS

| | | |
|---|---|---|
| 8,752,623 B2 | 6/2014 | Sirota et al. |
| 2012/0325467 A1* | 12/2012 | Lebel ..................... E21B 43/16 166/263 |

\* cited by examiner

EXTRACTION METHODS AND SYSTEMS FOR RECOVERY OF OIL FROM RESERVOIRS CONTAINING MOBILE WATER

CROSS-REFERENCE TO RELATED APPLICATIONS

This application claims priority to U.S. Provisional Application No. 62/599,439, filed Dec. 15, 2017, and also claims priority to U.S. Provisional Application No. 62/554,716, filed Sep. 6, 2017. The contents of all of the above are hereby incorporated in their entirety by reference.

BACKGROUND

Oils refer to crude oils which have high specific gravity and viscosity and are therefore difficult to extract commercially because they do not readily flow. Typically, these oils will have viscosities greater than 1000 mPa-s (centiPoise) or specific gravities greater than 0.934 kg/m$^3$ at 15.5° C. (60° F.) (i.e. less than 20 API). Oil wet reservoirs are oil deposits where the oil is the rock wetting fluid. Typically, these reservoirs have poorer recoveries due to the oil's strong adherence to the reservoir rock. There has long been sought a means to accelerate oil production processes by permitting the oil to flow more readily thereby increasing the rate of return on capital and decreasing the financial risk of such oil production projects.

One approach to oil extraction involves the use of steam in a thermal stimulation to facilitate oil extraction. Steam raises the temperature of the oil and thereby reduces its viscosity and allows it to flow more easily. The two main traditional approaches used in steam recovery systems have been "huff and puff" (i.e., cyclic steaming) and steam floods. Steam stimulation is subject to a number of problems, including heat losses during injection, clay swelling problems, thief zones, emulsions, capillary surface tension effects and lack of confinement for shallower zones. Further, injecting steam creates water (condensate) in the formation which is much less viscous than oil and which will therefore be preferentially produced due to relative permeability effects. Preferential production of water makes the oil production or recovery more difficult.

Another approach to oil extraction is steam assisted gravity drainage (SAGD). SAGD begins with the formation of a steam chamber in the formation. The steam is injected at the chamber surface. The heated oil flows down the walls of the chamber under the influence of gravity and drains into the production well, thereby increasing the size of the chamber. SAGD employs the countercurrent flow of steam upwards into the reservoir and oil down and out of the reservoir, which in certain situations can be relatively efficient, and provide oil production rates high enough to provide favorable economics. There are many possible SAGD geometries including single well (injection and production from the same well) and dual or multiple well. The wells may be either horizontal or vertical. Generally horizontal wells are favored by producers because they offer a greater (longer) exposure to the pay zone and thereby offer increased production rates for highly viscous oils.

Yet another approach is the vapor extraction (VAPEX) process, which proposes to combine a heated solvent (propane) with hot water heated at surface to provide downhole heat. Because of the use of hot water, this process suffers from the problems mentioned above (countercurrent heat exchange, formation damage problems with clays, emulsions, capillary pressure, water treatment, water supply, reduced oil relative permeability due to high water saturations and the like).

Oil wet reservoirs often require surfactants to alter the wettability of the reservoir. When added to a flooding mechanism, the oil can be removed in a more typical fashion. Unfortunately, incorrect application of surfactants can damage a reservoir beyond repair.

Existing heated solvent processes and Steam-assisted Gravity Drainage (SAGD) processes have typically been avoided for extraction from reservoirs that contain mobile water, as the mobile water has been thought to be detrimental to all forms of enhanced oil recovery (EOR). Thin pay zones have not been considered for SAGD due to associated high heat losses to the surrounding rocks.

In addition, existing heated solvent processes do not work in the carbonate reservoirs due to substantially higher reservoir pressure required which precludes the use of condensing vapor or condensing solvent processes. Moreover, the use of heated propane as the solvent, as used in processes like the VAPEX process, can cause asphaltene plugging of the well, resulting in a substantial loss of recoverable oil. Further, surfactants typically are cost ineffective due to rock absorption rates.

While the application of heat or chemicals, either directly to the reservoir or via the injection of heated solvents, has a demonstrated effect in mobilizing oil for extraction, each of the above processes suffers from the disadvantage of having either high energy requirements for the generation of the steam and/or heated solvents or a damaging reaction. The energy requirements are typically met through the burning of large amounts of fuel, usually natural gas. This leads to the emission of enormous amounts of greenhouse gases such as carbon dioxide. For example, a 100,000 barrels (bbl) of oil per day SAGD facility requires 200,000-300,000 bbl water per day to be converted into steam. Thus, to recover 100,000 bbl oil per day using a natural gas burner system results in producing more than 12 million pounds per day of carbon dioxide emissions.

Therefore there is a need for an energy efficient and cost effective process for stimulating production of oil, and which does not suffer from the aforementioned problems, such as asphaltene deposition/plugging.

BRIEF SUMMARY

In one embodiment, an improved extraction process for recovering oil from an oil reservoir containing mobile water is described. The extraction process establishes at least one injection well and at least one production well. A first solvent may be injected into the oil reservoir through the injection well to form a combined first solvent and oil mixture. A first solvent may be miscible in the oil while carried to the oil by the first solvent. The combined first solvent and oil mixture may be recovered from at least one production well to produce a first recovered oil fraction and first solvent mixture. The extraction process may then separate the first recovered oil fraction and first solvent mixture to produce a first recovered oil fraction and a separated first solvent. A second solvent may be injected into the oil reservoir through the injection well (or another injection well) to form a combined second solvent and residual oil mixture. The combined second solvent and residual oil mixture may be recovered from the production well (or another production well) to produce a second recovered residual oil fraction and second solvent mixture. The recovered residual oil fraction and second solvent mixture may be separated to produce a second recovered oil fraction and a separated second solvent.

In some embodiments, the first recovered oil fraction and the second recovered oil fraction may be combined to produce a combined recovered oil fraction, wherein the combined recovered oil fraction may comprise a yield from about 50% to about 100%. The first solvent may be at a temperature from about 10° C. to about 40° C. during the step of injecting the first solvent into the oil reservoir through the at least one injection well. The second solvent may be at a temperature from about 10° C. to about 40° C. during the step of injecting the second solvent into the oil reservoir through the at least one injection well. The first solvent and the second solvent may be at the temperature of the oil reservoir.

In some embodiments, the first solvent may comprise a methane, an ethane, a propane, a butane, a pentane, a hexane, terpenes, benzene, toluene, aromatic hydrocarbons, water, and combinations thereof. In some embodiments, the second solvent may comprise a terpene or combination of terpenes, a turpentine, an alcohol, an aromatic hydrocarbon, water, and combinations thereof. The second solvent may comprise at least one diverting agent. The diverting agent may be selected from the group consisting of a viscous surfactant, a polymer, a $CO_2$, and an acid. The diverting agent may be present at a concentration from about 0.01% to about 50%, by volume of a second solvent.

In another embodiment, an extraction process according to the present disclosure may include injecting a first solvent into the oil reservoir through the at least one injection well to form a first mixture, the first mixture comprising the first solvent, a first portion of mobile water, and a first portion of oil. The extraction process may further include injecting a second solvent into the oil reservoir through the at least one injection well to form a second mixture, the second mixture comprising the second solvent, a second portion of mobile water, and a second portion of oil. The extraction process may further include injecting water into the oil reservoir through the at least one injection well to form a flooded injected water and oil mixture. The water may be a water exogenous to the oil reservoir, or a water recovered from the oil reservoir, or a combination thereof. The water may be injected into the oil reservoir through the at least one injection well after injecting the second solvent into the oil reservoir through the at least one injection well.

BRIEF DESCRIPTION OF THE DRAWINGS

The file of this patent contains at least one drawing executed in color. Copies of this patent with color drawings will be provided by the Patent and Trademark Office upon request and payment of the necessary fee.

Exemplary embodiments of the present disclosure are described herein with reference to the drawings, wherein like parts are designated by like reference numbers, and wherein.

DETAILED DESCRIPTION

The present disclosure relates, in some embodiments, to an extraction process for recovering oil from an oil reservoir or reservoir that includes oil and mobile water. The extraction process utilizes a first solvent and a second solvent, or a combination thereof, which may be provided to or injected into the oil reservoir at an injection well. The first and second solvent may be injected at a reservoir temperature, at a reservoir pressure, above reservoir pressure. According to some embodiments, an extraction process using a first solvent and a second solvent may desirably provide for a greater recovered oil fraction in comparison to a corresponding extraction process not having the first solvent and the second solvent. The extraction process described herein using a first solvent and a second solvent may desirably provide for a displacement of mobile water within an oil reservoir, which may increase propagation, diffusion, contact, or a combination thereof, of the first solvent or the second solvent with the oil. The first solvent, the second solvent, the oil, the water, or combinations thereof, may be recovered through one or more production wells.

As discussed above, the first solvent and the second solvent may be injected into the oil reservoir at one or more injection wells at a reservoir temperature or the temperature of the oil reservoir. For example, since an oil reservoir may have a temperature from about 10° C. to about 40° C., a first solvent, a second solvent, or a combination thereof, may be injected into the oil reservoir at a temperature from about 10° C. to about 40° C. By injecting the first and/or second solvent at the oil reservoir temperature, the extraction process may advantageously increase a yield of a recovered oil fraction.

Figure 1:
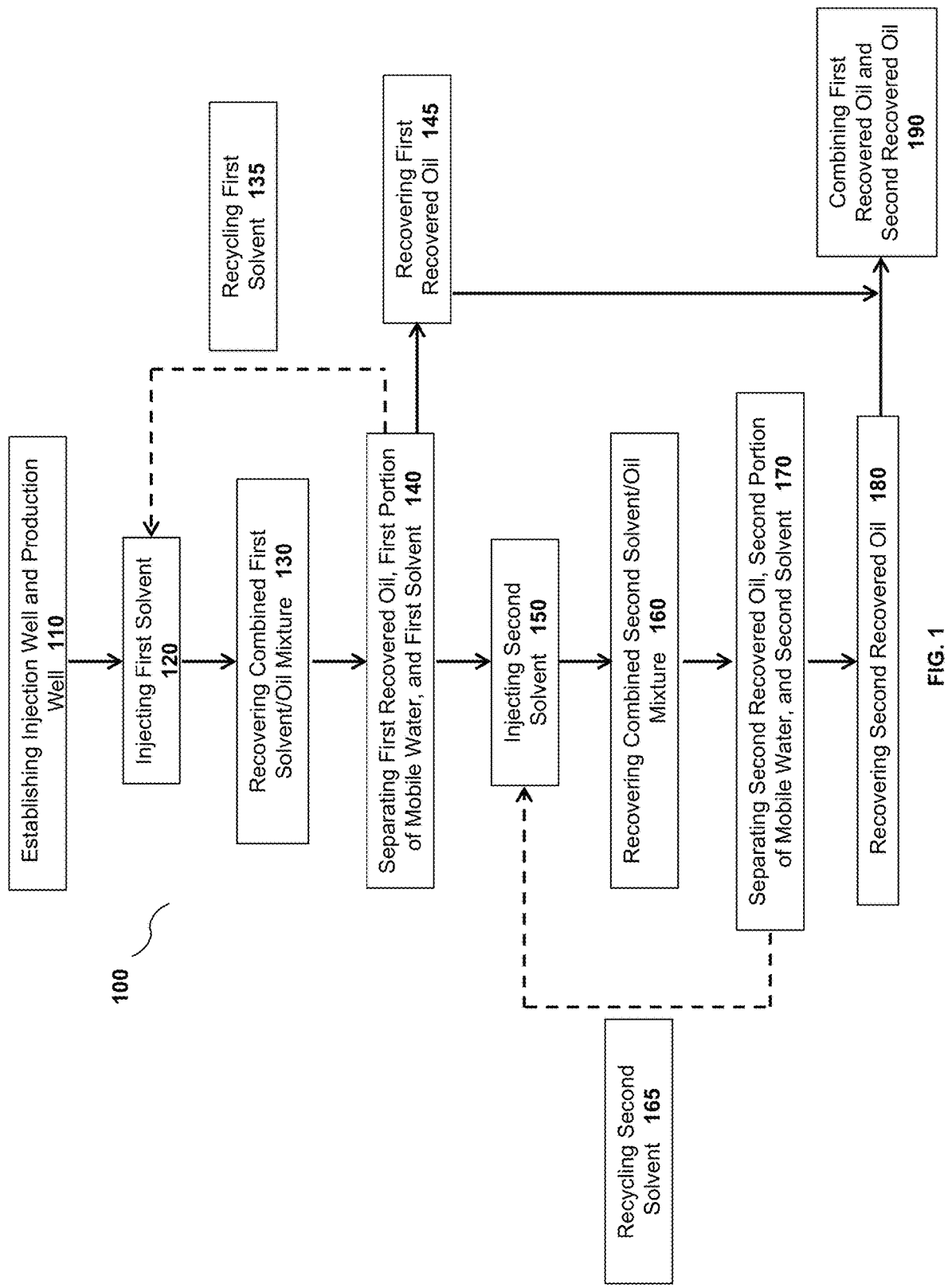
FIG. 1 illustrates an extraction process for recovering an oil from an oil reservoir according to a specific example embodiment of the disclosure.
Figure 2:
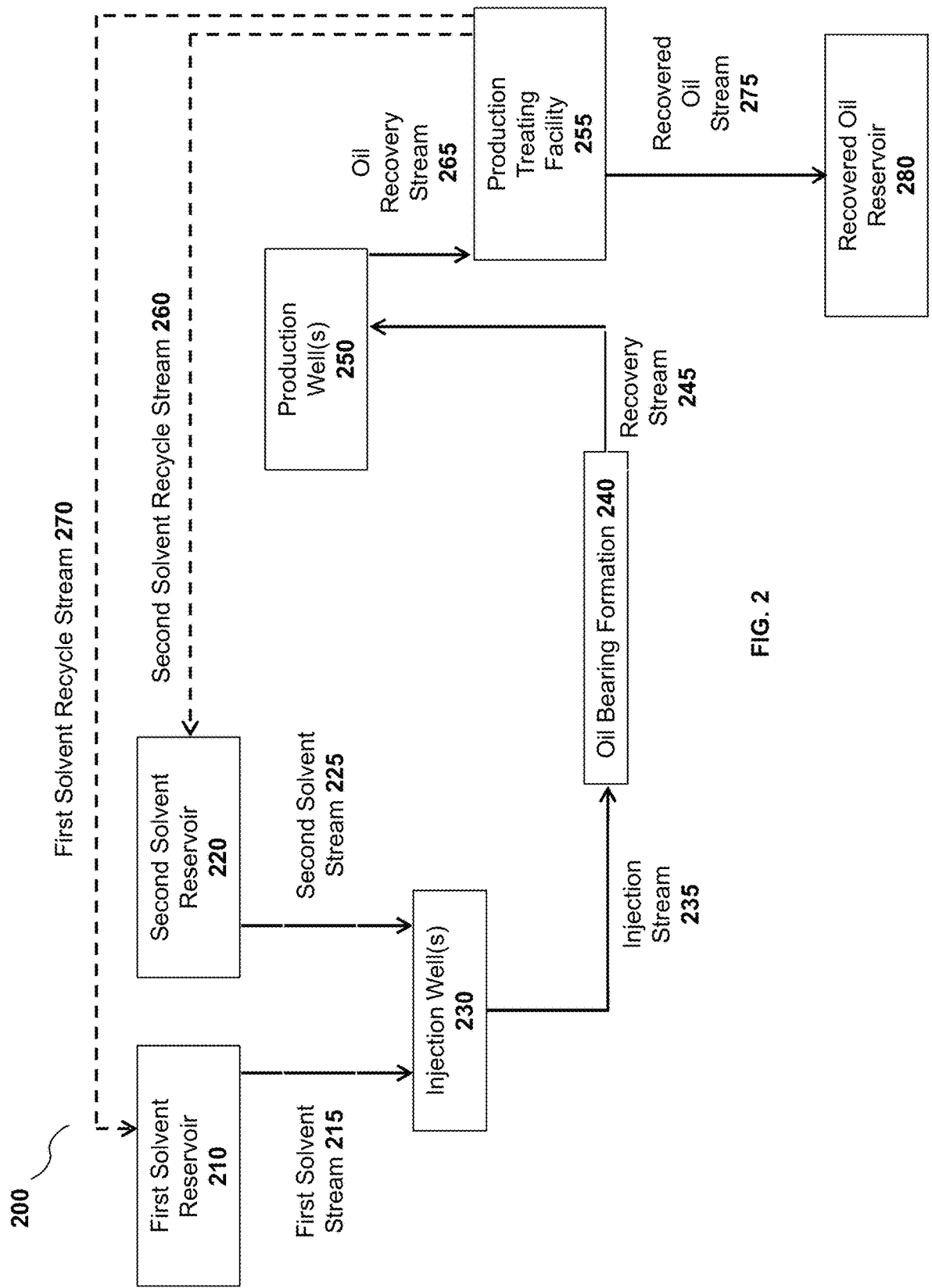
FIG. 2 illustrates a system for extracting oil from an oil reservoir according to a specific example embodiment of the disclosure.
Figure 3:
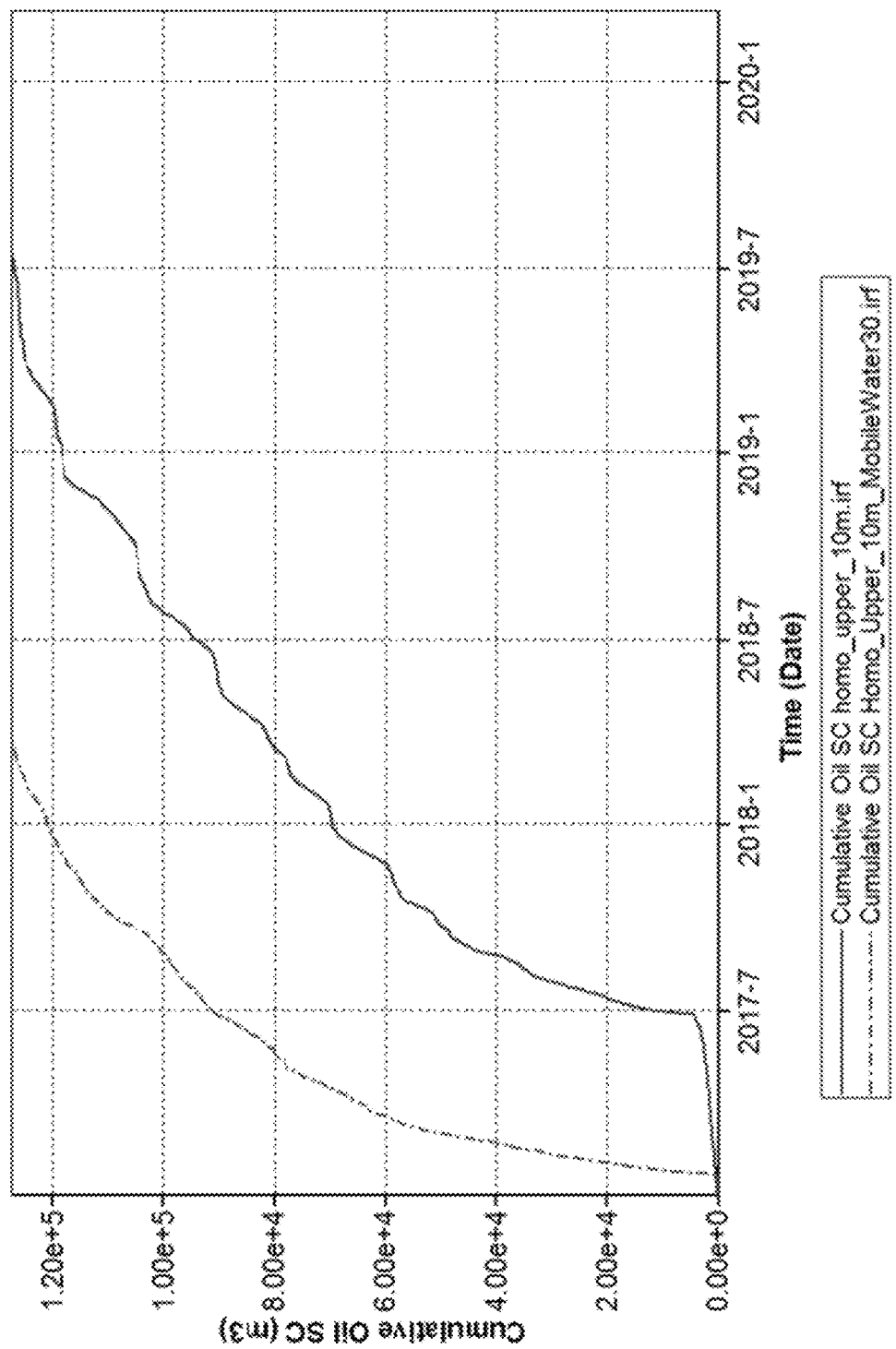
FIG. 3 illustrates a graphical representation of an oil recovery with mobile water and without mobile water according to a specific example embodiment of the disclosure.
Figure 4:
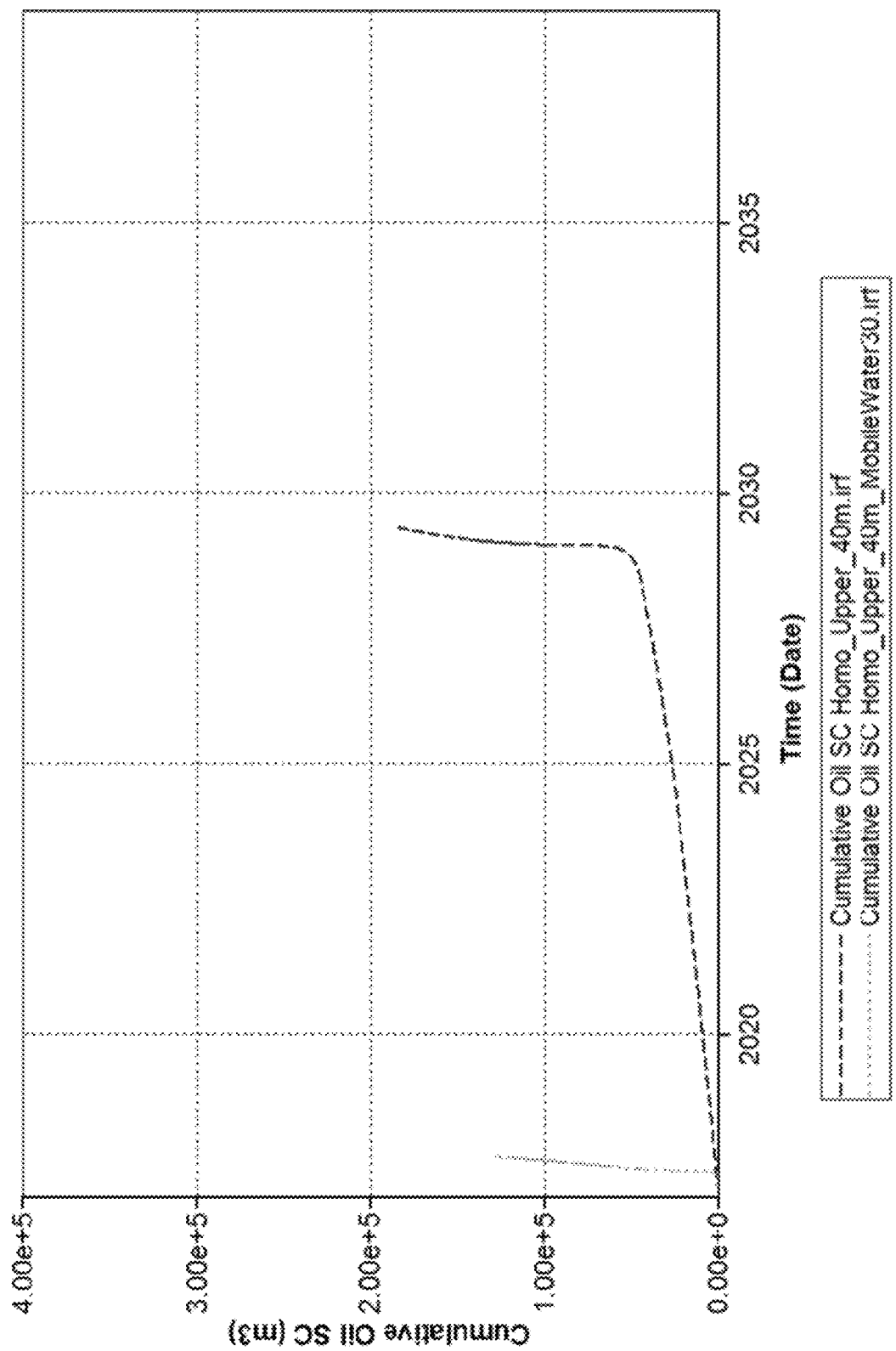
FIG. 4 illustrates a graphical representation of an oil recovery with mobile water and without mobile water according to a specific example embodiment of the disclosure.
Figure 5:
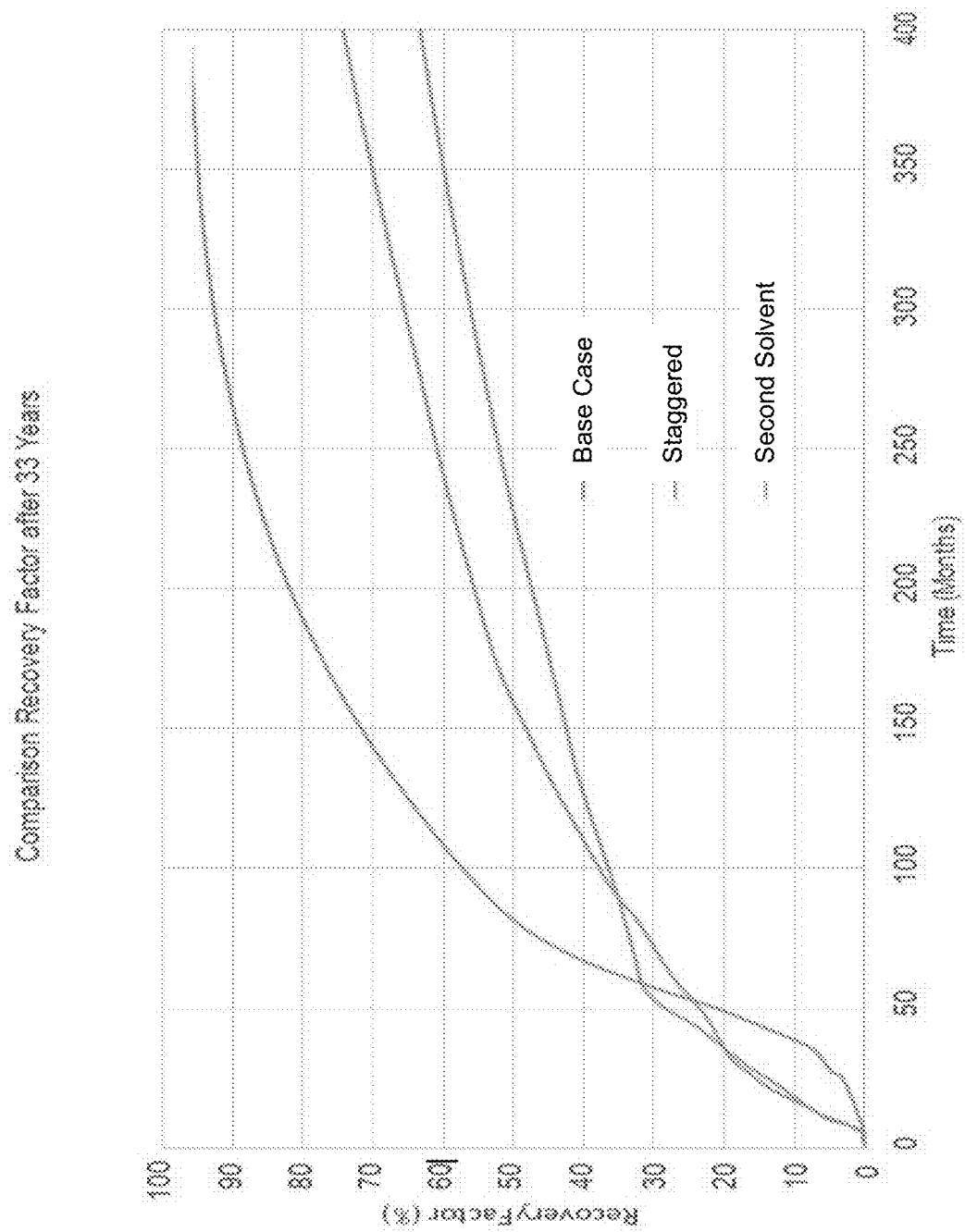
FIG. 5 illustrates oil recovery based on well configuration according to a specific example embodiment of the disclosure.
Figure 6B:
FIG. 6B illustrates a thief water zone according to a specific example embodiment of the disclosure.
Figure 6B:
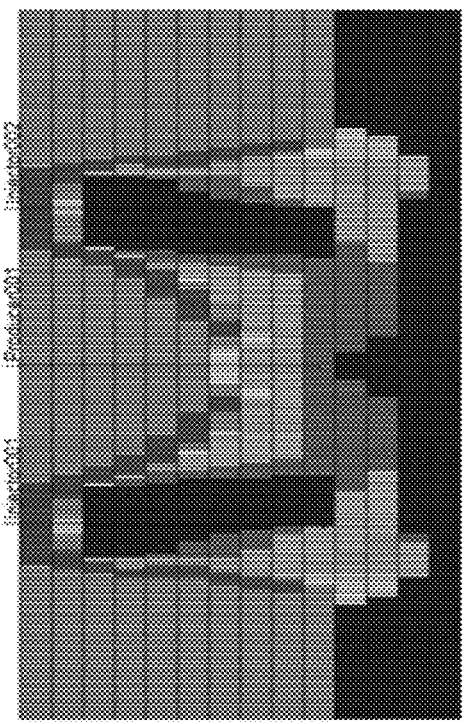

Example embodiments are shown in FIGS. 1-6B. FIG. 1 illustrates an extraction process for recovering an oil from an oil reservoir containing mobile water. FIG. 2 illustrates a system for extracting oil from an oil reservoir. FIG. 3 illustrates a graphical representation of an oil recovery with mobile water and without mobile water according to a specific example embodiment of the disclosure. FIG. 4 illustrates a graphical representation of an oil recovery with mobile water and without mobile water. FIG. 5 illustrates oil recovery based on well configuration. FIGS. 6A and 6B illustrate a thief water zone according to a specific example embodiment of the disclosure.

FIG. 1 illustrates an extraction process 100 for recovering oil from an oil reservoir containing mobile water. The extraction process 100 may comprise the steps of a) establishing one or more injection wells and one or more production wells 110, b) injecting a first solvent into the oil reservoir through the at least one injection well to form a first mixture, the first mixture comprising the first solvent, a first portion of mobile water, and a first portion of oil 120, recovering the first mixture from the at least one production well to produce a first recovered oil mixture, the first recovered oil mixture comprising the first solvent, the first portion of the mobile water, and the first portion of oil 130; (d) separating the first recovered oil mixture to produce a first recovered oil fraction that is separated from the first portion of mobile water and the first solvent 140, and recovering the first recovered oil 145. Additionally, the process may include a step of recycling the separated first solvent 135.

The above described extraction process 100 also includes the steps of (e) injecting a second solvent into the oil reservoir through the at least one injection well to form a second mixture, the second mixture comprising the second solvent, a second portion of mobile water, and a second portion of oil 150; (f) recovering the second mixture from the at least one production well to produce a second recovered oil mixture, the second recovered oil mixture comprising the second solvent, the second portion of the mobile water, and the second portion of oil 160; and (g) separating the second recovered oil mixture to produce a second recovered oil fraction that is separated from the second portion of mobile water and the second solvent 170. The second recovered oil fraction may comprise reservoir water. The combined recovered oil fractions may provide for a yield from about 50% to about 100%. The yield may include percent oil contained in the oil reservoir at the initiation of the oil recovery process. For example, the combined recovered oil fractions may provide for a yield from about 50% to about 90% of the oil present in the oil reservoir prior to the extraction process, within the first 10 years of oil recovery, but may incrementally increases to a complete recovery, or a yield of 100%, over a 25 year period. The first recovered oil fraction and the second recovered oil fraction may be combined 190. Additionally, the separated second solvent may be recycled 165.

The injecting of the first solvent into the oil reservoir 120 and the injecting of the second solvent into the oil reservoir 150 may be performed iteratively, concurrently, and sequentially. In some embodiments, the second solvent may not be used. In other embodiments, the first solvent may be injected and then the second solvent may be injected into the oil reservoir. The second solvent may desirably provide for asphaltene dissolution, which may mitigate an effect of asphaltene deposition. In some embodiments, the first solvent may be combined with the second solvent and then the combined solvent mixture may be injected into the oil reservoir. The first solvent and the second solvent may be mixed at various ratios and then injected into the oil reservoir. For example, the ratio of first solvent to second solvent may include from about 1:99 to about 1:1. Additionally, the ratio of first solvent to second solvent may include from about 1:1 to about 99:1.

The first solvent and the second solvent may be injected into the oil reservoir at a temperature from about 10° C. to about 40° C. and at a pressure from about 50 kPa to about 1500 kPa above original reservoir pressure. Additionally, the extraction process may proceed without the use of surfactants, where the use thereof may require additional purification steps to remove the surfactants from the final oil product(s). Therefore, the extraction process 100 described above may desirably provide for advantages over conventional processes, the advantages including higher recovered oil yields, lower capital requirements, solvent injections operating below fracture pressure, and maintenance of overall reservoir pressure. Also, the dual solvent extraction process 100 described above may displace mobile reservoir water and propagate deep within the oil reservoir, which may provide for a higher yield of recovered oil contacted by the mobile water that would be otherwise inaccessible to conventional processes.

The extraction process 100 may be suitable for extracting oil, including a heavy oil and a light oil, from oil reservoirs such as carbonate rock deposits (e.g., dolomite or limestone reservoirs) and oil wet reservoirs, but may also be used in other formations such as oil sands deposits. The hybrid cold solvent process 100 may employ combinations of solvents that can be optimized for water wet, oil wet, and fractionally wet reservoirs.

The above described extraction process 100 may also include a water flooding or water injection stage. Water injection prior to solvent injection may be desirable in some cases where mobile flow pathways between the injection well and the production well are not available. Water may also be injected into the oil reservoir after the step of injecting the second solvent into the oil reservoir 150; and after the step of recovering the combined second solvent/oil mixture 160. Water injection may be done with fresh water or by mobile water recovered from the extraction process 100. Late water injection may be a viable solvent injection step.

The separation of the first recovered oil mixture to produce a first recovered oil fraction that is separated from the first portion of mobile water and the first solvent 140 or the separation of the second recovered oil mixture to produce a second recovered oil fraction that is separated from the second portion of mobile water and the second solvent 170 may also include purifying the first solvent or the second solvent. The separation may include separation from water and then recovering the solvent from the produced oil. The water may be recovered mobile water. For example, the recovered first solvent or recovered second solvent may be distilled before recycling them back into the extraction process 100.

The extraction process described above 100 may facilitate the removal of an asphaltene deposition in the oil reservoir, which may increase the recovered oil yield, quality, and purity. Reducing, removing, preventing, and/or mitigating an asphaltene deposition may desirably provide for the reduction and/or avoidance of plugging or clogging of pores and may maintain open flow pathways to the production well, thereby permitting an increased ability for extraction of the oil within the reservoir.

The extraction process described above 100 may be performed in batch injections, continuous injections, or combinations thereof. Additionally, solvent injection methods, injection pressures, and rates may be adjusted periodically or instantaneously depending on the oil recovery yield from the oil reservoir.

The first solvent and the second solvent from the process above 100 may be chosen for ease of use, recyclability, commodity price, and availability. For example, the first solvent may include a light hydrocarbon such as a methane, an ethane, a propane, a butane, a pentane, a hexane, and combinations thereof. Use of a hydrocarbon solvent comprising a propane as a first solvent in an extraction process may provide for an in situ de-asphalting of an oil, which may provide for a production of a commercially enhanced product for sales.

The second solvent may be a non-petroleum based "green" solvent. For example, the non-petroleum based green solvent may be derived from a processed biomass or be a by-product of a wood, a pulp, a paper industry, or a combination thereof. The second solvent may include biomass based terpenes such as limonene. The second solvent may include a terpene or combination of terpenes, a turpentine, an alcohol, an aromatic hydrocarbon, or a combination thereof. Terpenes may be hemiterpenes, monoterpenes, sesquiterpenes, diterpenes, triterpenes, tetraterpenes, and combinations thereof. Alcohols may be methanol, ethanol, propanol, isopropanol, butanol, and combinations thereof. An aromatic hydrocarbon may be a benzene, a toluene, a xylene, and combinations thereof.

The second solvent may include a diverting agent, which may desirably provide for a stimulation of the oil reservoir, which may provide for a uniform injectivity profile of the second solvent in comparison to a corresponding second solvent not having the diverting agent. The diverting agent may be a viscous surfactant, a polymer, a $CO_2$, or combinations thereof. An extraction process comprising a diverting agent may desirably provide for an increase in a sweep efficiency, an increase in a yield of recovered oil, or a combination thereof in comparison to a corresponding extraction process not having the diverting agent. The concentration of diverting agent in the second solvent may range from about 1% to about 50%, by volume of the second solvent. For example, a second solvent may comprise a $CO_2$ at a concentration of about 10%, by volume of the second solvent.

The first and second solvents may have the same or different viscosities. For example, the second solvent may have a higher viscosity than the first solvent, which may desirably provide for an increased recovered oil percentage than extraction processes using a second solvent comprising a lower viscosity than the first solvent. In this case, using the less viscous first solvent to establish a communication between the injection well and the production well, followed by an injection of the more viscous second solvent may compensate for channeling tendencies in the oil reservoir formation. Additionally, it may be possible to ensure that deposition of asphaltene is mitigated and a high percentage of the oil is contacted and recovered.

FIG. 2 illustrates a system 200 for extracting oil from an oil reservoir. The system 200 includes a first solvent reservoir 210, an injection well 230, a second solvent reservoir 220, an oil reservoir 240, a production well 250, production treating facility 255, and a recovered oil reservoir 280. The production treating facility 255 may separate first solvent(s) from a first recovered oil, separate water from the first recovered oil, separate second solvent(s) from the second recovered solvent and oil mixture, separate water from the second recovered solvent and oil mixture, distill recovered solvents, recycle the first solvent, recycle the second solvent, distill recovered oil, purify recovered oil, and combinations thereof.

In the above described system 200, the injection well 230 is connected to the first solvent reservoir 210 through a first solvent stream 215. The injection well 230 is connected to the second solvent reservoir 220 through a second solvent stream 225. The oil reservoir 240 is connected to the injection well 230 through an injection stream 235. The production well 250 is connected to the oil reservoir 240 through a recovery stream 245. Optionally, the production treating facility 255 may be connected to the second solvent reservoir 220 through a second solvent recycle stream 260. Optionally, the production treating facility 255 may be connected to the first solvent reservoir 210 through a first solvent recycle stream 270. The production treating facility 255 may be connected to the production well(s) 250 through the oil recovery stream 265. The recovered oil reservoir 280 may be connected to production treating facility 255 through a recovered oil stream 275.

Additionally, in the system 200 described above, the injection well 230 is configured to receive a first solvent from the first solvent reservoir 210 through the first solvent stream 215. The injection well 230 is configured to receive a second solvent from the second solvent reservoir 220 through the second solvent stream 225. The production treating facility 255 is configured to receive an oil recovery stream 265 from the production well(s) 250. The recovered oil reservoir 280 is configured to receive a recovered oil from the production treating facility 255 through a recovered oil stream 275. The first solvent reservoir 210 is configured to receive a recycled first solvent from the production treating facility 255 through the first solvent recycle stream 270. The second solvent reservoir 220 is configured to receive a recycled second solvent from the production treating facility 255 through the second solvent recycle stream 260. In some embodiments, the system 200 may comprise a surface processing facility. The surface processing facility may derive water from the recovered oil, may recycle solvent, may refine recovered oil, and combinations thereof. A system may be configured to suit the situation and improve the results of the process. For example, components of the system may be adjusted including vertical spacing of components, horizontal spacing of components, length in between components, length of system, relative elevation of the oil reservoir, vertical displacement of the production well(s), vertical displacement of the injection well(s), and combinations thereof.

As will be understood by those skilled in the art who have the benefit of the instant disclosure, other equivalent or alternative compositions, devices, processes, methods, and systems for extracting an oil form an oil reservoir comprising a mobile water can be envisioned without departing from the description contained herein. Accordingly, the manner of carrying out the disclosure as shown and described is to be construed as illustrative only.

Persons skilled in the art may make various changes in the shape, size, number, and/or arrangement of parts without departing from the scope of the instant disclosure. For example, the position and number of solvents and extractions may be varied. In some embodiments, solvents may be interchangeable. In addition, the size of a device and/or system may be scaled up or down to suit the needs and/or desires of a practitioner. Each disclosed process, method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Where open terms such as "having" or "comprising" are used, one of ordinary skill in the art having the benefit of the instant disclosure will appreciate that the disclosed features or steps optionally may be combined with additional features or steps. Such option may not be exercised and, indeed, in some embodiments, disclosed systems, compositions, apparatuses, and/or methods may exclude any other features or steps beyond those disclosed herein. Elements, compositions, devices, systems, methods, and method steps not recited may be included or excluded as desired or required. Persons skilled in the art may make various changes in methods of preparing and using a composition, device, and/or system of the disclosure.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range.

For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value +/− about 10%, depicted value +/− about 50%, depicted value +/− about 100%) and/or a range endpoint. With respect to the former, a value of 50 depicted in an example, table, and/or drawing may form the basis of a range of, for example, about 45 to about 55, about 25 to about 100, and/or about 0 to about 100. Disclosed percentages are volume percentages except where indicated otherwise.

All or a portion of a system for extraction and recovery of oil from reservoirs containing mobile water may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

EXAMPLES

Some specific example embodiments of the disclosure may be illustrated by one or more of the examples provided herein.

Example 1: Mobile Water Compared to Immobile Water Start-Up Comparison at 10 m Apart In a heavy oil reservoir that is oil wet, a solvent cocktail was used to displace oil. In this example, one production well was placed between two injection wells and the distance between injection well and production well was 10 m. The recovery factors with and without mobile water present are shown in FIG. 3.

Example 2: Mobile Water Compared to Immobile Water Start-Up Comparison at 40 m Apart In a heavy oil reservoir that is oil wet, a solvent cocktail was used to displace oil. In this example one production well was placed between two injection wells and the distance between each injection well and production well was 10 m. The recovery factors with and without mobile water present are shown in FIG. 4. As shown in FIG. 4, increasing the distance between the injector and the producer from 10 m to 40 m makes production less feasible unless mobile water is present.

Example 3: Solvent Composition Compared to Optimal Well Configuration

In a similar scenario as in Example 1, production acceleration and improved sweep efficiency can be reached if the producer is augmented by the injection of a second producer at a different depth (higher or lower in the formation depending on the solvent cocktail composition). This additional well may create new displacement pathways and may improve sweep efficiency by order of magnitude in respect to time. As shown in FIG. 5, employing a staggered well configuration may provide for a desirable oil recovery.

Well placement near a water/oil interface may allow fast spreading of a solvent and may allow access to very large volumes of oil. This may accelerate production and may be an advantageous option compared to a VAPEX type process.

Example 4: Thief Water Zone Presence

Figure 6A:
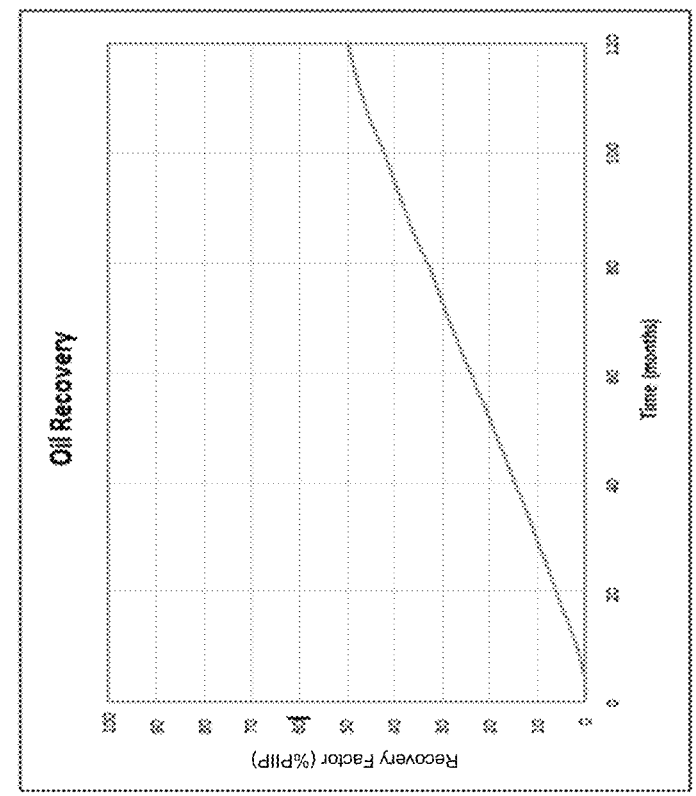
FIG. 6A illustrates a thief water zone according to a specific example embodiment of the disclosure.

As shown in FIGS. 6A and 6B, the presence of a water thief zone may be taken advantage of to carry the solvent from injector to producer, add oil/solvent contact and accelerate oil production. In such cases it is anticipated that the production of water will be higher than previous cases.

What is claimed is:

1. An extraction process for recovering oil from an oil reservoir comprising mobile water, the extraction process comprising:
    (a) establishing at least one injection well and at least one production well;
    (b) injecting a first solvent into the oil reservoir through the at least one injection well to form a first mixture, the first mixture comprising the first solvent, a first portion of mobile water, and a first portion of oil, wherein the first solvent comprises a light hydrocarbon selected from the group consisting of a methane, an ethane, a propane, a butane, a pentane, a hexane, and combinations thereof;
    (c) recovering the first mixture from the at least one production well to produce a first recovered oil mixture, the first recovered oil mixture comprising the first solvent, the first portion of the mobile water, and the first portion of oil;
    (d) separating the first recovered oil mixture to produce a first recovered oil fraction that is separated from the first portion of mobile water and the first solvent;
    (e) injecting a second solvent into the oil reservoir through the at least one injection well to form a second mixture, the second mixture comprising the second solvent, a second portion of mobile water, and a second portion of oil, wherein the second solvent comprises a non-petroleum based solvent selected from the group consisting of a terpene, a limonene, a hemiterpene, a monoterpene, an alcohol, a sesquiterpene, a diterpene, a triterpene, a tetraterpene, and combinations thereof;
    (f) recovering the second mixture from the at least one production well to produce a second recovered oil mixture, the second recovered oil mixture comprising the second solvent, the second portion of the mobile water, and the second portion of oil; and
    (g) separating the second recovered oil mixture to produce a second recovered oil fraction that is separated from the second portion of mobile water and the second solvent.

2. The extraction process according to claim 1, wherein the first solvent further comprises water.

3. The extraction process according to claim 1, wherein the second solvent further comprises water.

4. The extraction process according to claim 1, further comprising combining the first recovered oil mixture and the second recovered oil mixture to produce a combined recovered oil mixture, wherein the combined recovered oil fraction comprises a yield of about 50% to about 90% of the oil present in the oil reservoir prior to the extraction process.

5. The extraction process according to claim 1, wherein the first solvent is at a temperature from about 10° C. to about 40° C. during the step of injecting the first solvent into the oil reservoir through the at least one injection well.

6. The extraction process according to claim 1, wherein the second solvent is at a temperature from about 10° C. to about 40° C. during the step of injecting the second solvent into the oil reservoir through the at least one injection well.

7. The extraction process according to claim 2, wherein the water is present at a concentration from about 0.1% to about 50%, by volume of the first solvent.

8. The extraction process according to claim 3, wherein the water is present at a concentration from about 0.1% to about 50%, by volume of the second solvent.

9. The extraction process according to claim 1, wherein the first solvent further comprises water at a concentration from about 0.1% to about 50%, by volume of the first solvent, and wherein the second solvent further comprises water at a concentration from about 0.1% to about 50%, by volume of the second solvent.

10. The extraction process according to claim 1, further comprising injecting the separated first solvent into the oil reservoir through the at least one injection well to form a combined separated first solvent and oil mixture.

11. The extraction process according to claim 1, further comprising injecting the separated second solvent into the oil reservoir through the at least one injection well to form a combined separated second solvent and oil mixture.

12. The extraction process according to claim 1, further comprising injecting water into the oil reservoir through the at least one injection well to form an injected water and oil mixture.

13. The extraction process according to claim 12, wherein the water comprises a water exogenous to the oil reservoir.

14. The extraction process according to claim 12, wherein injecting water into the oil reservoir through the at least one injection well is performed after the injecting the second solvent into the oil reservoir through the at least one injection well.

15. The extraction process according to claim 1, further comprising:
(h) adding a third solvent selected from the group consisting of $CO_2$, and $N_2$, into the oil reservoir through the at least one injection well;
(i) shutting the oil reservoir for a time of from about 1 day to about 7 days to form a combined third solvent and second residual oil mixture; and
(j) opening the oil reservoir; and
recovering at least a portion of the third solvent and second residual oil mixture from the at least one production well to produce a recovered third solvent and second residual oil mixture.

16. An extraction system for extracting and recovering an oil from an oil reservoir comprising mobile water, the extraction system comprising:
(a) at least one injection well connected to the oil reservoir through an injection stream;
(b) at least one production well connected to the oil reservoir through a recovery stream;
(c) a first solvent reservoir connected to the injection well through a first solvent stream, wherein the injection well is configured to receive a first solvent from the first solvent reservoir through the first solvent stream, and wherein the first solvent comprises a light hydrocarbon selected from the group consisting of a methane, an ethane, a propane, a butane, a pentane, a hexane, and combinations thereof;
(d) a second solvent reservoir connected to the injection well through a second solvent stream, wherein the injection well is configured to receive a second solvent from the second solvent reservoir through the second solvent stream, and wherein the second solvent comprises a non-petroleum based solvent selected from the group consisting of a terpene, a limonene, a hemiterpene, a monoterpene, an alcohol, a sesquiterpene, a diterpene, a triterpene, a tetraterpene, and combinations thereof;
(e) a production treating facility connected to the production well through an oil recovery stream, wherein the production treating facility is configured to receive a first solvent and oil mixture and a second solvent and oil mixture from the production well; and
(f) a recovered oil reservoir connected to the production well through the oil an oil recovery stream, wherein the recovered oil reservoir is configured to receive a recovered oil from the production treating facility through a recovered oil stream.

17. The extraction system of claim 16, wherein the first solvent reservoir is connected to the production treating facility through a first solvent recycle stream, and wherein the first solvent reservoir is configured to receive a recycled first solvent from the production treating facility through the first solvent recycle stream.

18. The extraction system of claim 16, wherein the second solvent reservoir is connected to the production treating facility through a second solvent recycle stream, and wherein the second solvent reservoir is configured to receive a recycled second solvent from the production treating facility through the second solvent recycle stream.

19. The extraction process according to claim 1, wherein steps (a) to (g) are repeated at least once.

20. The extraction process according to claim 1, wherein both the first solvent and the second solvent are simultaneously injected through the at least one injection well.

21. An extraction process for recovering oil from an oil reservoir comprising mobile water, the extraction process comprising:
(a) establishing at least one injection well and at least one production well;
(b) injecting a first solvent into the oil reservoir through the at least one injection well to form a first mixture, the first mixture comprising the first solvent, a first portion of mobile water, and a first portion of oil, wherein the first solvent comprises a non-petroleum based solvent selected from the group consisting of a terpene, a limonene, a hemiterpene, a monoterpene, an alcohol, a sesquiterpene, a diterpene, a triterpene, a tetraterpene, and combinations thereof;
(c) recovering the first mixture from the at least one production well to produce a first recovered oil mixture, the first recovered oil mixture comprising the first solvent, the first portion of the mobile water, and the first portion of oil;
(d) separating the first recovered oil mixture to produce a first recovered oil fraction that is separated from the first portion of mobile water and the first solvent;
(e) injecting a second solvent into the oil reservoir through the at least one injection well to form a second mixture, the second mixture comprising the second solvent, a second portion of mobile water, and a second portion of oil, wherein the second solvent comprises a light hydrocarbon selected from the group consisting of a methane, an ethane, a propane, a butane, a pentane, a hexane, and combinations thereof;

(f) recovering the second mixture from the at least one production well to produce a second recovered oil mixture, the second recovered oil mixture comprising the second solvent, the second portion of the mobile water, and the second portion of oil; and (g) separating the second recovered oil mixture to produce a second recovered oil fraction that is separated from the second portion of mobile water and the second solvent.

* * * * *